UNITED STATES PATENT OFFICE.

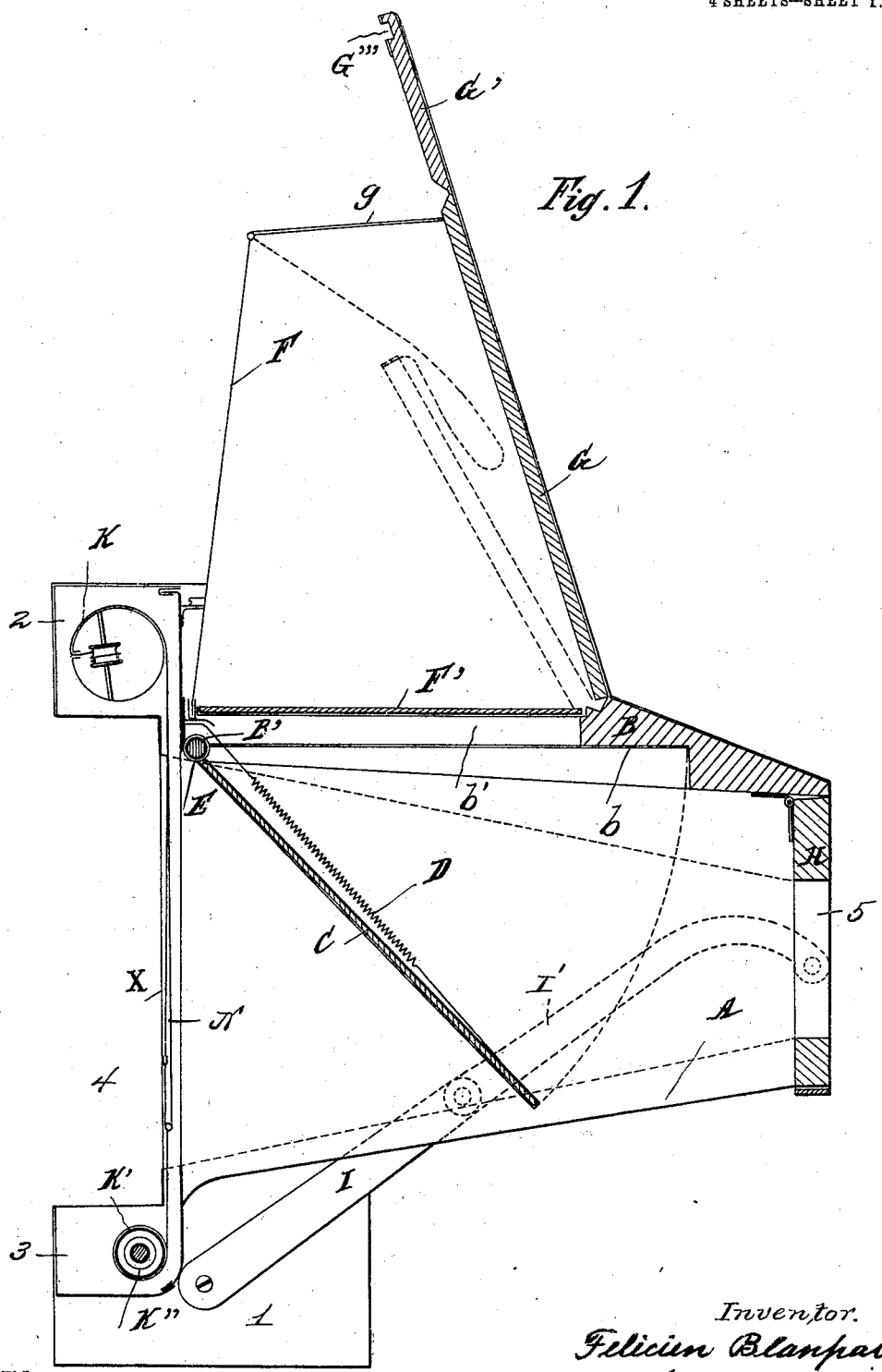

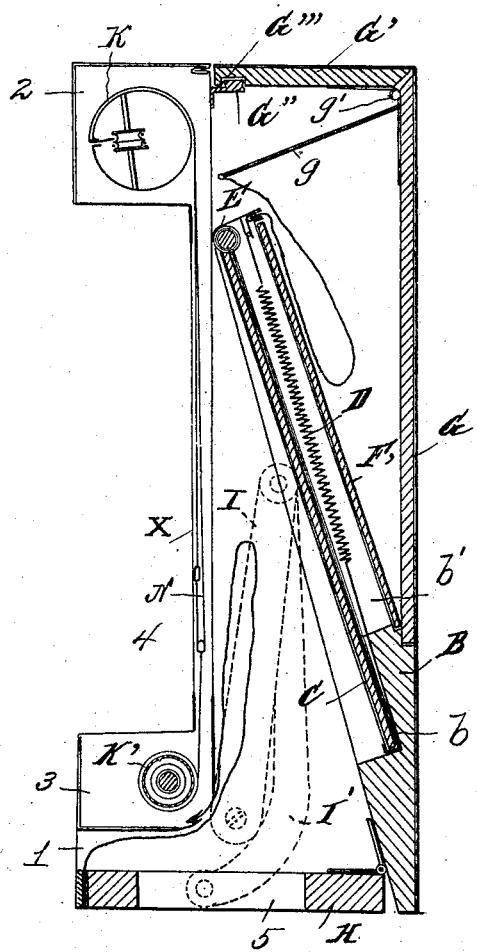

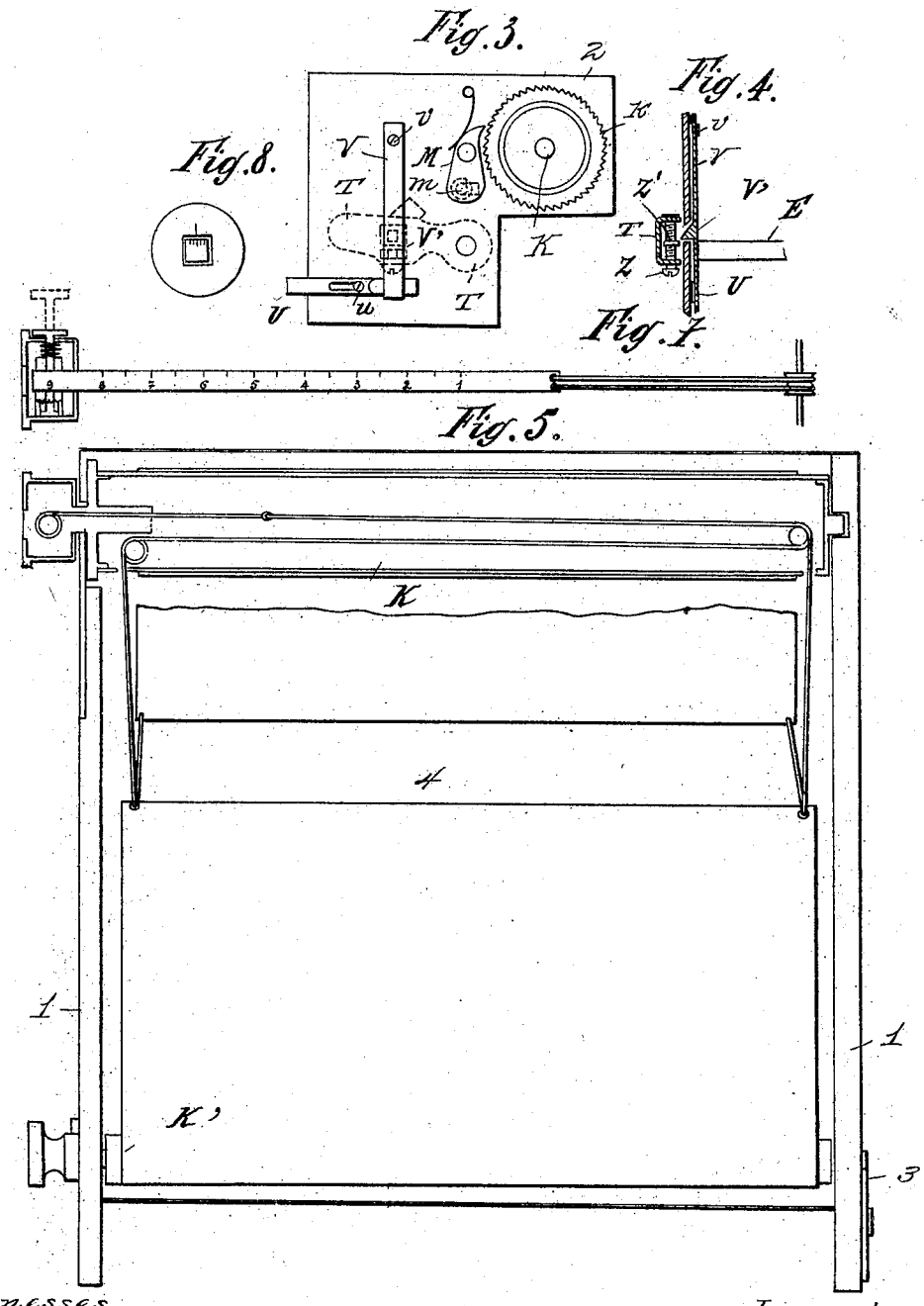

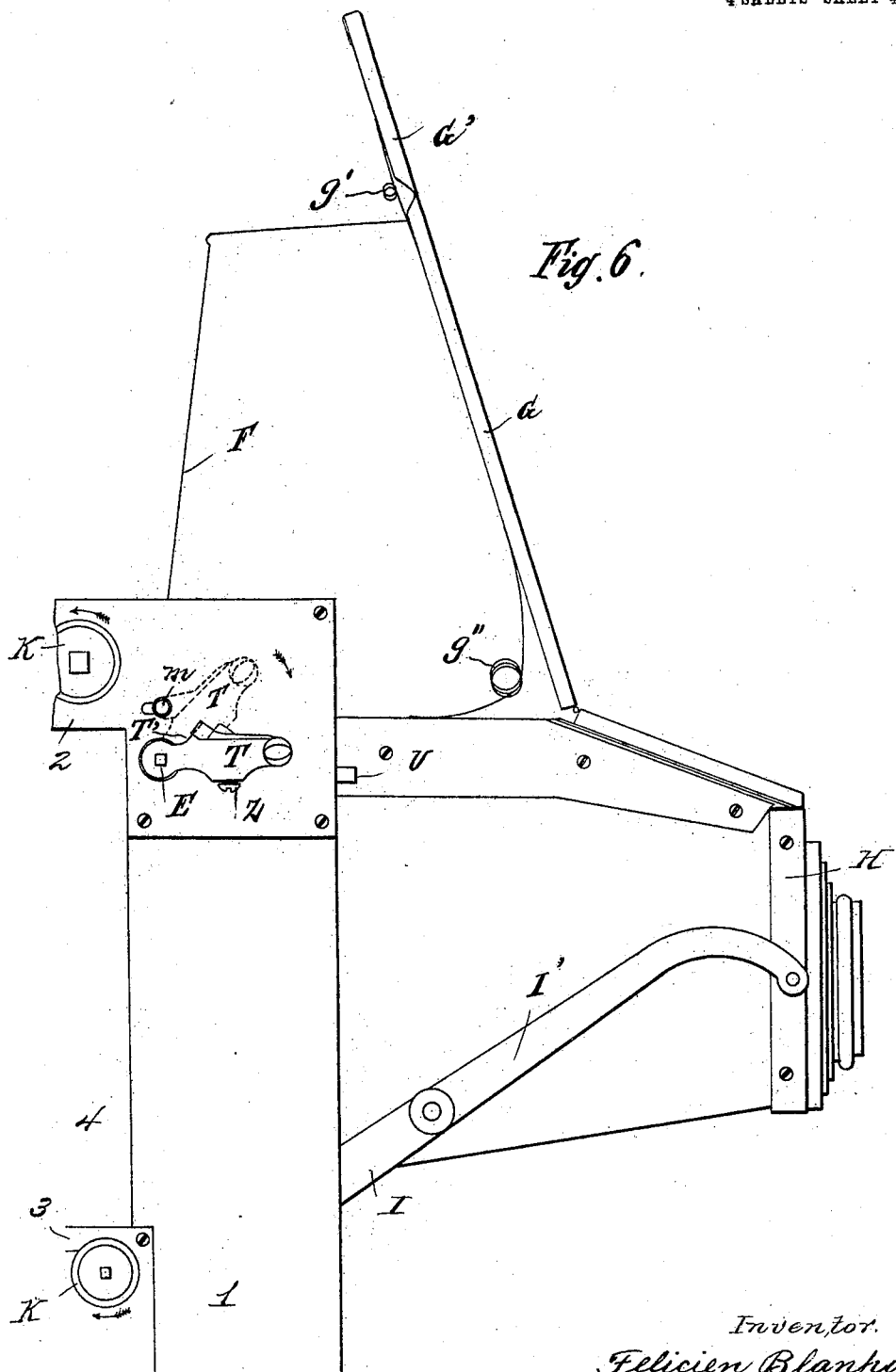

FÉLICIEN BLANPAIN, OF BRUSSELS, BELGIUM.

PHOTOGRAPHIC CAMERA.

No. 795,953.　　　　Specification of Letters Patent.　　　　Patented Aug. 1, 1905.

Application filed December 27, 1904. Serial No. 238,404.

*To all whom it may concern:*

Be it known that I, FÉLICIEN BLANPAIN, draftsman, a subject of the King of Belgium, residing at 11 Rue Dumonceau, in the city of Brussels, Kingdom of Belgium, have invented certain new and useful Improvements in and Connected with Photographic Cameras; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

My invention relates to photographic cameras; and it consists in a variety of novel features, details, and combinations hereinafter explained in the specification and set forth in the claims.

In the drawings accompanying this description, Figure 1 is a vertical sectional view of the apparatus, showing the parts extended and ready for use. Fig. 2 is a vertical sectional view showing the parts folded. Fig. 3 is a detail side view of the retaining and releasing mechanism for the mirror and shutter. Fig. 4 is a detail vertical section of the retaining and releasing mechanism of the mirror. Fig. 5 is a rear elevation, partly in section, a portion of the shutter being broken away. Fig. 6 is a side elevation of the apparatus with the parts in the positions shown in Fig. 1. Fig. 7 is a detail plan view of the scale attached to the shutter, and Fig. 8 is an end view of the casing for the scale.

Although the best results are obtainable by a mirror apparatus, the objections to its use in field photography and the like are its great weight and dimensions, so that both amateurs and professional photographers hesitate to adopt it, and owing to various objections such apparatus have hitherto had a comparatively narrow field of application.

It is the purpose of the present invention to remove these defects and extend the range of usefulness of such apparatus.

Prominent among the objects sought are to reduce to about one-third the volume and weight of mirror apparatus as heretofore constructed to provide for the use of either plate-holders or magazines for films.

These objects I attain by the construction shown in the accompanying drawings, which contemplate providing a blind or shutter with two rollers and mounting the rollers at the rear to leave between them sufficient space for the reception of a magazine for films or a holder for plates, in constructing and arranging the several parts so that they may be assembled into a small space, most of said parts performing a double function, and in arranging the mirror and shutter in such a manner as to operate either in the direction of the length or of the width of the plate, or in both directions.

The apparatus consists of a casing composed of two side pieces 1 1, supporting an upper receptacle 2 and a lower receptacle 3, in which the shutter-operating mechanism is inclosed, and between said receptacles is formed a space 4 for the reception of the plate-holder or magazine for film. A main supporting element B is pivoted between said sides, near the upper rear part thereof, and to the under face of the support, at or near its front end, is hinged a plate H, having an aperture 5, adapted to receive and hold the camera-lens. The lens-plate H holds the supporting element B in operative position, and the former is supported by means of pivotally-connected links I and I', which are pivoted on the inside of the sides 1 and sides of plate H, respectively. A large bellows A, open at the top, is preferably attached to the bottom and the two sides of the lens-plate H by any approved means and at its rear to the inside of the side pieces 1 and to the front of the lower receptacle 3. On the rear part of the support B are mounted bearings B', in which a spindle E is journaled, carrying a focusing-mirror C. This spindle is provided with a handle T, Figs. 3 and 6, by which the mirror is rotated within the bellows, as will be hereinafter explained. A spring D is preferably secured at one end to the support B above the spindle E and at its other end to the free end of the mirror, normally holding the latter on a seat $b$, formed in the support. The support B is further provided with an opening $b'$, covered by a ground-glass plate F', upon which an image reflected by the mirror C is thrown when the latter is in the position for focusing, as shown in Fig. 1.

A plate G is hinged to the support B at the front edge of the opening $b'$ and serves as one side of a focusing-bellows F, which incloses the ground glass F'. The lower edge of the focusing-bellows is attached in any convenient manner around the edge of the glass, and said bellows is automatically opened and held distended by a ring $g$, fastened at an angle to the plate G and to the top edge of said bellows. This plate G forms the greater portion of the camera-box front, a part of the support B forming the remaining portions, while an extension G′, hinged to the plate G, forms the top by turning down and resting upon a flange G″ on the front of the upper receptacle 2, the flange locking into a groove G‴ on the under face of the extension. The lens-plate H forms the bottom when the apparatus is closed, as shown in Fig. 2.

The shutter-carrying rollers K and K′ are mounted in the upper and lower receptacles 2 and 3, respectively, and as their operating mechanism forms no part of my present invention it need not be described in detail.

In unfolding the apparatus the top or extension G′ is released from the flange G″ and automatically extended and held in the same longitudinal plane as the plate G by a spring $g′$, the plate G being simultaneously raised and held in position by a similar spring $g″$, holding the bellows F distended, as shown in Fig. 6. The support B is then swung up into a horizontal position, carrying the lens-plate with it, distending the bellows A, these parts being held in position by the pivoted links I and I′. The mirror is then positioned for focusing by rotating the spindle E by depressing the handle T in the direction of the arrow, Fig. 6. To hold the mirror in position at exactly forty-five degrees in the right angle formed by the sensitized plate and the ground glass and lock it in that position against the action of the spring D, I provide a tooth Z′ on the handle, which when the mirror reaches the right position is engaged by a stop V′, mounted on an arm V, pivoted at $v$ to the casing and adapted to swing into the path of the tooth. The tooth Z′ is adjustable on the handle by means of the screw Z to permit of a perfect adjustment of the mirror. To release the tooth from the catch V′, I provide a slide U, mounted to reciprocate on a pin $u$, projecting from the casing through a slot in the slide. One end of the slide projects beyond the side of the casing, by means of which it is manipulated, and the other end is connected with the swinging arm V in any suitable manner. When the stop and tooth are in engagement, the slide is in the position shown in Figs. 3 and 6, and by pushing the slide in the arm V is carried with it, moving the stop out of the path of the tooth Z′. As soon as the handle T is released the mirror is thrown up by the action of the spring D, carrying the handle with it, and a tappet T′ on the handle engages a lug $m$ on a pawl M and throws the latter out of engagement with ratchet $k$, mounted on one end of the shaft K, which operates the shutter N through the medium of a spring K″ on shaft K′.

The operation of my invention has already been sufficiently described in connection with the foregoing description of form and arrangement of parts.

What I therefore claim as novel, and desire to secure by Letters Patent, is—

1. In a camera of the character described, a casing comprising two sides, bellows-supports adapted to form the front of the casing, and a lens-support adapted to form the bottom of said casing.

2. In a camera of the character described, a casing comprising two side pieces, a bellows-support pivoted to the latter, a focusing-bellows support hinged to the bellows-support, a lens-support hinged to the latter, said bellows-supports adapted to form the front of the casing and the lens-support the bottom of the casing.

3. In a camera of the character described, a casing comprising two side pieces, a bellows-support pivoted to the latter, a focusing-bellows and a lens-support carried by the bellows-support, a bellows connected to the lens-support, a focusing-mirror in the bellows, and means for holding the bellows-support extended.

4. In a camera of the character described, a casing comprising two side pieces, a main bellows, a support therefor pivoted between the sides, a focusing-bellows, a support for the latter carried by the aforesaid support, a focusing-mirror pivoted to swing in the main bellows, a lens-support carried by the main-bellows support and secured to its bellows, and links hinged to the sides and to the lens-support, for the purpose specified.

5. A camera of the character described, comprising two sides, shutter-operating mechanism supported thereby, a main bellows, a support therefor pivoted between said sides, a glass in said support, a focusing-bellows inclosing said glass, a support for the focusing-bellows carried by the first-named support, a focusing-mirror pivotally mounted on the first-named support, means for normally holding the mirror against the support and means for locking the mirror in focusing position.

6. A camera of the character described comprising two sides, receptacles for the shutter-operating mechanism mounted on the sides to form a space for the reception of a plate-holder, a main bellows, a support therefor carried by the sides, a focusing-mirror pivoted on the support adapted to swing in the bellows, means for normally holding the mirror against the support, a glass seated in the support, a focusing-bellows inclosing said glass, a support for the focusing-bellows hinged to the aforesaid support, means for locking the mirror in focusing relation to the glass, and mechanism for operating the mirror and shutter-operating mechanism.

7. In a photographic camera and in combination with a casing and a main supporting element mounted therein, a focusing-bellows and plate therefor mounted on the main support, and means for automatically unfolding the bellows when the front is raised.

8. In a photographic camera and in combination with a casing, and a main supporting element pivoted therein, a focusing-bellows and a supporting-plate therefor, and an extension on the supporting-plate adapted to fold back and close the upper part of the apparatus when the parts are assembled.

9. In a foldable camera, the combination with a shallow casing, of a support and a focusing-mirror mounted within and extensible beyond the casing and adapted to fold down and be assembled within the same.

10. In a foldable camera, the combination with a shallow casing, of a support and a focusing-mirror mounted within and extensible beyond the casing and adapted to fold down and be assembled within the same, and a focusing-plate carried by said support.

11. In a foldable camera, the combination with a shallow casing, of a main support pivoted within and extensible beyond the same, a bellows carried by the support, and a focusing-mirror mounted on the support and operating in the bellows and adapted to swing down into the casing.

12. In a foldable camera, the combination with a rigid casing, of a support pivoted therein and adapted to swing beyond the same, a bellows carried by the support, a focusing-mirror pivoted within the casing and adapted to swing beyond the same in the bellows, a seat on the support for the mirror, means to hold the latter on its seat, means to lock it off its seat, a focusing-plate fixed in the support, a focusing-bellows, and a support therefor carried by the aforesaid support.

In testimony that I claim the foregoing as my invention I have signed my name in presence of two subscribing witnesses.

FÉLICIEN BLANPAIN.

Witnesses:
VICTOR LEONARD,
EUGÈNE VANDENPLAS.